United States Patent
Yanagi et al.

(10) Patent No.: US 6,728,171 B2
(45) Date of Patent: Apr. 27, 2004

(54) ARRANGEMENTS FOR CORRECTION OF FOCUSING LIGHT BEAM, AND SYSTEM USING THE SAME

(75) Inventors: Masashi Yanagi, Tokuyama (JP); Nobuo Kimura, Kudamatsu (JP); Tetsuo Andou, Kudamatsu (JP); Hidekazu Nakamoto, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 54 days.

(21) Appl. No.: 10/083,542

(22) Filed: Feb. 27, 2002

(65) Prior Publication Data

US 2003/0012091 A1 Jan. 16, 2003

(30) Foreign Application Priority Data

Jul. 13, 2001 (JP) .................................... 2001-213006

(51) Int. Cl.[7] ................................................. G11B 7/00
(52) U.S. Cl. ............................... 369/44.14; 369/44.23; 369/112.23
(58) Field of Search ........................... 369/44.32, 44.23, 369/44.24, 53.28, 44.14, 44.15, 44.17, 44.18, 112.23

(56) References Cited

U.S. PATENT DOCUMENTS 5,321,678 A * 6/1994 Takishima et al. ........ 369/44.14
5,740,139 A * 4/1998 Marino et al. ............ 369/44.32
5,742,573 A * 4/1998 Hajjar et al. .............. 369/44.32
6,496,452 B2 * 12/2002 Stallinga et al. .......... 369/44.23

* cited by examiner

*Primary Examiner*—Nabil Hindi
(74) *Attorney, Agent, or Firm*—Antonelli, Terry, Stout & Kraus, LLP (57) ABSTRACT

Focusing method and exposure apparatus for focusing both a parallel light beam and a non-parallel light beam through a movable objective lens onto an object. A negative feedback loop is provided which has a detector for receiving a reflection light beam of the non-parallel light beam passed through the movable objective lens, reflected at the object and passed through the movable objective lens, for generating a detection signal corresponding to a focus deviation of the non-parallel light beam, and a driver for receiving the detection signal to control a position of the movable objective lens in accordance with the detection signal, so that the detection signal is decreased. The negative feedback loop further includes a correction signal generator for generating a correction signal and supplying it to the negative feedback loop as a disturbance of the loop so that the parallel light beam is focused onto the object.

19 Claims, 8 Drawing Sheets

ARRANGEMENTS FOR CORRECTION OF FOCUSING LIGHT BEAM, AND SYSTEM USING THE SAME

CROSS-REFERENCE TO THE RELATED APPLICATION

The present invention is related to U.S. patent application Ser. No. 10/024725 entitled "APPARATUS AND METHOD FOR FOCUSING LIGHT BEAM AND EXPOSURE APPARATUS" filed on Dec. 21, 2001.

BACKGROUND OF THE INVENTION

The present invention generally relates to a focus control method and an apparatus therefor. More particularly, the present invention is concerned with a focus control method and an apparatus therefor which can advantageously be employed in an optical recording system (which may also be referred to as the exposure system) for optically recording data on a medium such as an optical disk or the like. Further, the preset invention is concerned with the optical recording system itself as well.

In the exposure equipment or optical writing system for optically writing or recording data on a medium such as a disk or the like, a focus control apparatus is employed for maintaining constant the distance which intervenes between a disk (i.e., object, hereinafter also referred to as the raw disk) and an objective lens. For effectuating the focus control, a focusing light beam having a wavelength differing from that of a recording or writing light beam is employed for protecting the raw disk against the influence exerted by the focusing light beam. Heretofore, a so-called achromatic lens whose focal position or focal length remains the same for different wavelengths has been used as the objective lens for the purpose of focusing the recording light beam. Thus, both the focusing light beam and the recording light beam can impinge onto the objective lens in the form of parallel light beams without incurring any appreciable degradation in the focusing precision or accuracy even when the optical path length changes due to upward/downward movement or displacement of the objective lens following the change in the position of the raw disk.

As one of the related art, there may be mentioned, for example, the system which is disclosed in Japanese Patent Application Laid-Open Publication No. 73491/1995 (JP-A-7-73491).

With the conventional system such as disclosed in the above-mentioned publication, an achromatic lens is used as the objective lens. Accordingly, even when the wavelength of the recording laser beam differs from that of the focusing laser beam, there makes appearance no difference in the focal length due to the different wavelengths.

However, for the recording light beam of a wavelength in the deeper or shorter ultraviolet range for systems of the next generation, the achromatic lens is not available as the objective lens yet. In general, in order to make the position of the focal point of the recording light beam incident on the objective lens as the parallel light beam coincide with that of the focal point of the focusing light beam in the case where the achromatic lens is not employed as the objective lens, it is required to cause the focusing light beam to be incident on the objective lens in a non-parallel state in consideration of refraction ascribable to the difference in the wavelength. As a consequence of this, when the optical path length of the focusing light beam changes due to upward/downward movement or displacement of the objective lens in following the change in the position of the raw disk, the position of the focal point of the focusing light beam undergoes change, giving rise to a problem that the focusing precision or accuracy becomes degraded.

Figure 1:
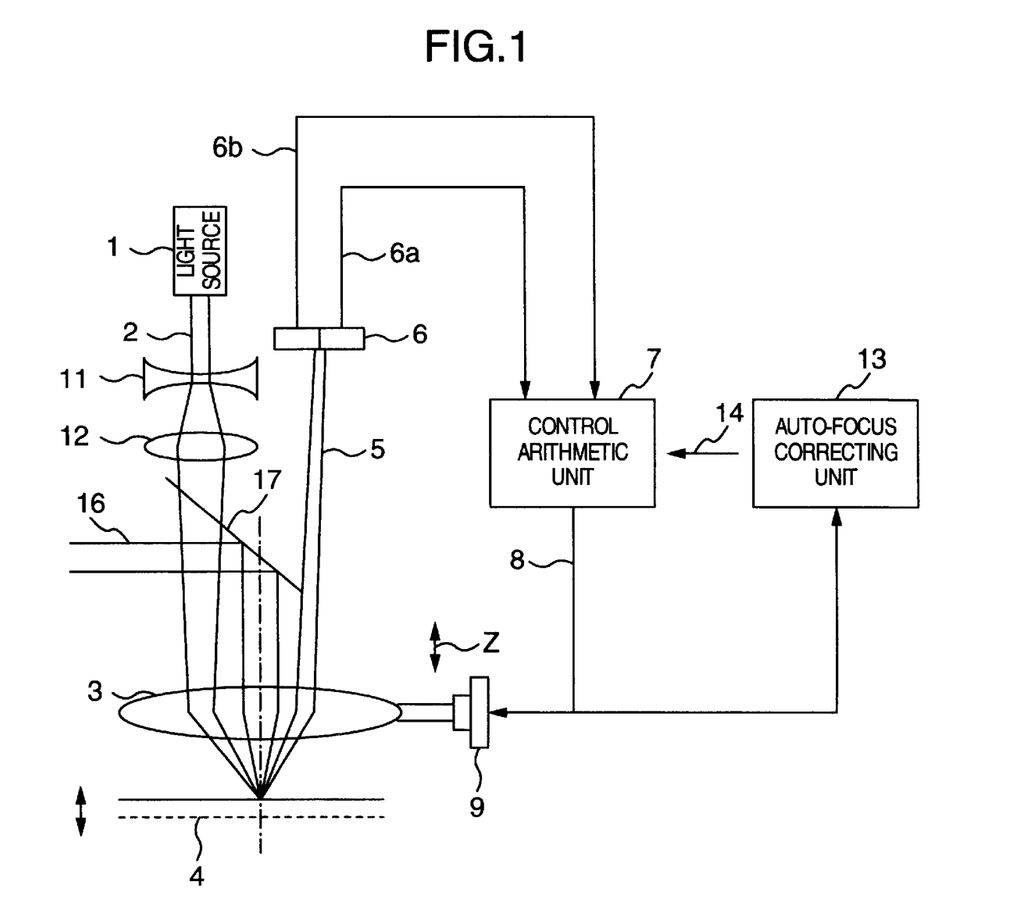
FIG. 1 is a view showing generally and schematically a structure of a focus control apparatus according to an embodiment of the present invention.

More specifically, referring to FIG. 1 of the accompanying drawings, it is assumed that a commercially available objective lens 3 (rated for ca. 250 nm) is employed in combination with a convex lens 12 (having a focal length f=2.0 mm) with the inter-lens distance of 150 mm between the objective lens 3 and the convex lens 12. In this optical system, when the raw disk 4 moves downwardly or descend by 1 $\mu$m, being accompanied with downward movement of the objective lens 3 by 1 $\mu$m in following the displacement of the raw disk, i.e., when the optical path length increases by 1 $\mu$m, the position of the focal point of the focusing light beam will deviate from that of the recording light beam by ca. 40 nm. Since the flatness of the raw disk 4 is on the order of 10 $\mu$m according to the standard specifications, there will arise deviation on the order of 400 nm at maximum between the position of the focal point of the recording light beam and that of the focusing light beam, which is comparable to the depth of focus for the recording light beam of wavelength in the deeper ultraviolet range, thus exerting adverse influence to the focusing accuracy or precision.

SUMMARY OF THE INVENTION

In the light of the state of the art described above, it is an object of the present invention to provide a focus control method which is capable of performing the focus control with an enhanced accuracy without need for employing an achromatic lens as the objective lens.

Another object of the present invention is to provide a focus control apparatus for carrying out the method mentioned above.

It is a further object of the present invention to provide an exposure or optical recording system which incorporates the above-mentioned focus control apparatus.

In view of the above and other objects which will become apparent as the description proceeds, it is taught according to a general aspect of the present invention that change in the optical path length of the focusing light beam is detected by detecting upward/downward movement(s) of the objective lens to thereby control the movement of the objective lens so that the change in the optical path length of the focusing light beam can correctively be compensated for.

Thus, there is provided according to an aspect of the present invention a focus control method in which the change in the optical path length of the focusing light beam is detected by detecting upward/downward movement(s) of the objective lens for thereby driving the objective lens in such a manner that the focused state of the focusing light beam can be sustained or maintained.

Further, there is provided according to another aspect of the present invention a focus control apparatus in which a focusing light beam is used and which includes a unit for detecting change of the optical path length of the focusing light beam and a unit for correcting the position of an objective lens on the basis of the change as detected.

Furthermore, there is provided according to yet anther aspect of the present invention an optical recording system equipped with the focus control apparatus which includes a unit for detecting change of the optical path length precision of the focusing light beam and a unit for correcting the position of an objective lens on the basis of the change as detected.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE EMBODIMENTS

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "vertical", "upward", "downward" and the like are words of convenience and are not to be construed as limiting terms.

Now, the focus control apparatus according to an embodiment of the present invention will be described in detail by reference to FIGS. 1 and 2. FIG. 1 is a view showing generally and schematically a structural configuration of the focus control apparatus according to an embodiment of the invention. As can be seen in the figure, the focus control apparatus is generally comprised of two major portions, i.e., an optical system and a control system. The optical system includes a light source 1 for generating a focusing light beam 2, an objective lens 3 for focusing the light beam 2 onto the raw disk 4, and a dual type light receiving element 6 for receiving and detecting a reflection light beam 5 resulting from reflection of the focusing light beam 2 at the raw disk 4 to thereby output a pair of output signals A and B designated by 6a and 6b, respectively.

The writing or recording light beam 16 is inputted from a system differing from the focusing system to be subsequently reflected at a half-mirror 17 disposed intermediate between the convex lens 12 and the objective lens 3 in the direction toward the raw disk or object 4 to thereby irradiate a resist layer of the raw disk 4.

On the other hand, the control system is composed of a control arithmetic unit 7 designed for arithmetically determining difference between the output signals A and B (6a and 6b) of the dual type light receiving element 6 to thereby output an objective-lens control signal 8 and an objective-lens drive unit (driver) 9 for driving the objective lens 3 in response to the objective-lens control signal 8. The objective lens 3 is disposed above the raw disk 4 and so arranged as to be moved or driven in the vertical direction Z orthogonal to the raw disk 4 by means of the objective-lens drive unit (driver) 9.

Figure 3:
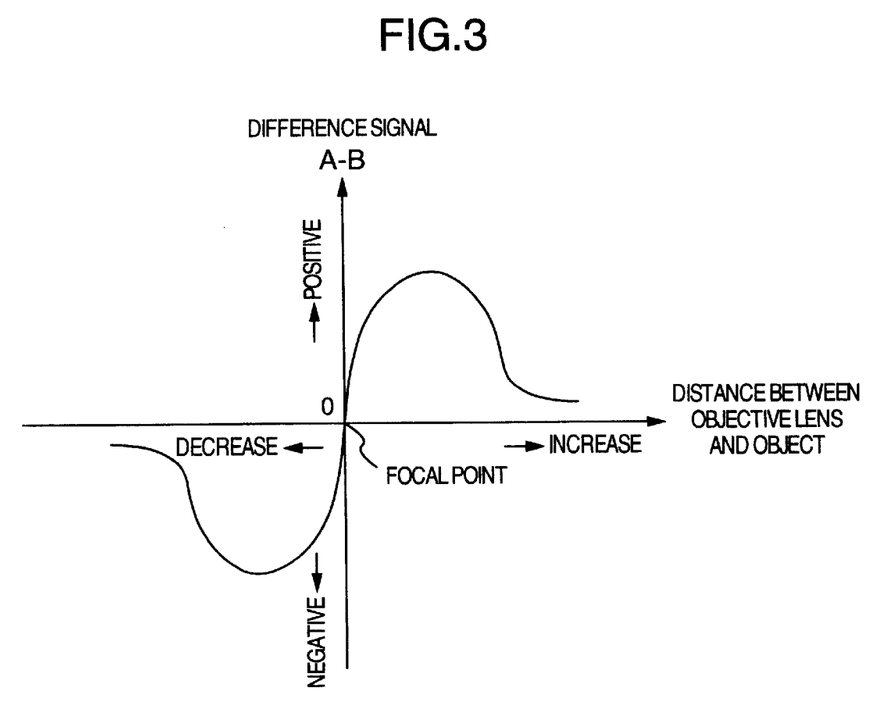
FIG. 3 is a waveform diagram showing a difference signal processed by a control arithmetic unit shown in FIG. 1.

In the focus control system, the focusing light beam 2 emitted from the light source 1 impinges onto the objective lens 3 to undergo refraction in the objective lens to be subsequently focused onto the raw disk 4. The focusing light beam reflected at the raw disk (object) 4 again undergoes refraction in the objective lens 3 to exit as the reflection light beam 5 which then impinges onto the dual type light receiving element 6. The paired outputs A and B (6a; 6b) of the dual type light receiving element 6 change in dependence on the distance intervening between the objective lens 3 and the raw disk 4. Accordingly, the output signals A and B of the dual type light receiving element 6 are inputted to the control arithmetic unit 7 for arithmetically determining displacement or movement of the objective lens 3 relative to the raw disk 4. The objective-lens control signal 8 outputted from the control arithmetic unit 7 is then fed to the objective-lens drive unit 9 to thereby maintain the focused state of the objective lens 3 relative to the raw disk 4. In an exemplary practical application, a skew type auto-focus scheme may be adopted in which a difference signal (A-B) outputted from the dual type light receiving element 6 is made use of. In this conjunction, the difference signal (A-B) outputted from the dual type light receiving element 6 exhibits a characteristic referred to as the S-curve characteristic, as is illustrated in FIG. 3. So long as the distance between the objective lens 3 and the raw disk 4 coincides with the focal length of the objective lens 3, the difference signal (A-B) mentioned above assumes a value zero. On the other hand, when the distance between the objective lens and the raw disk is shorter than the focal length of the objective lens, the difference signal (A-B) assumes minus polarity (negative value) while the polarity of the difference signal becomes plus (positive) in case the distance is longer than the focal length of the objective lens 3. Thus, by detecting the polarity and magnitude of the difference signal (A-B) and supplying the objective-lens control signal 8 generated on the basis of the difference signal to the objective-lens drive unit 9 so that the difference signal (A-B) always assumes zero, the objective lens 3 can be maintained in the state focused relative to the raw disk or object 4.

As will be appreciated from the above, the control system performs a negative feedback control so that the difference between the paired outputs A and B of the dual type light receiving element 6 constantly assumes the value zero, whereby pull-in operation is effectuated in conformance with the S-curve characteristic illustrated in FIG. 3, as a result of which the operating point of the control system is pulled-in to the center point of the S-curve so long as no disturbance affects the control system, whereby the operation thereof is stabilized.

At this juncture, it should be mentioned that the focusing light beam 2 emitted from the light source 1 is regulated to a non-parallel beam state through cooperation of a concave lens 11 and a convex lens 12 before being incident onto the objective lens 3 in consideration of the precondition that the objective lens 3 is not an achromatic lens. More specifically, when the objective lens 3 is not achromatic, the objective lens exhibits noncoincident focal points, respectively, for a recording light beam of different waveform (described later on) and the focusing light beam 2 incident on the objective lens 3 as the parallel beams, respectively. By way of example, let's assume that a recording light beam of 257 nm in wavelength is projected onto a commercially available objective lens rated for 257 nm in a parallel beam. In that case, in order to make the focal point of the objective lens for the recording light beam of 257 nm be coincident with that for the focusing light beam of 650 nm, it is required to set an angle of incidence of 5.5 degrees for the focusing light beam on the assumption that the incident beam diameter of the focusing light beam is 3.3 mm. To say in another way, the focusing light beam 2 is caused to be incident on the objective lens 3 in the non-parallel state. Consequently, when the objective lens moves in the vertical direction as viewed in the figure, the optical path length of the focusing light beam 2 and the reflection light beam 5 will change correspondingly, which in turn results in that the position of the reflection light beam 5 changes in dependence on the change of the optical path length, ultimately giving rise to change of the output of the dual type light receiving element 6. As a result of this, the objective-lens control signal 8 outputted from the control arithmetic unit 7 is affected correspondingly, incurring such unwanted situation that the objective lens 3 is driven in response to the change of the optical path length in addition to the driving quantity required for maintaining the focused state by the objective-lens drive unit 9. Thus, there arises a problem that the achievable focusing accuracy suffers degradation.

To say in another way, because the focusing light beam 2 is non-parallel light beam, the inter-lens distance between the convex lens 12 and the objective lens 3 will change when the objective lens 3 moves in following the upward/downward movement of the raw disk or object 4, which naturally involves corresponding change in the position of the focal point of the focusing light beam. In more concrete, reference is made to FIGS. 4A, 4B and 4C. As can be seen in these figures, as the inter-lens distance between the convex lens 12 and the objective lens 3 changes, the incidence distance changes correspondingly, as indicated by a, a' and a", whereby the imaging distance is caused to change, as indicated by b, b' and b". Selecting the state shown in FIG. 4B as the reference or datum state, it can be seen that in the state shown in FIG. 4A, the inter-lens distance between the convex lens 12 and the objective lens 3 decreased with the result that the incidence distance and the imaging distance increase, as indicated by a' and b", respectively, whereas in the state illustrated in FIG. 4C, both the incidence distance and the imaging distance decrease, as indicated by a" and b", respectively.

At this juncture, it is to be noted that since the recording light beam 16 is a parallel beam, the imaging distance does not change regardless of displacement or movement of the objective lens 3 in the vertical direction. Consequently, at the datum position (reference state) shown in FIG. 4B, the imaging distance of the focusing light beam coincides with that of the recording light beam. However, in the state illustrated in FIG. 4A, the imaging distance b' of the focusing light beam is longer than the imaging distance b of the recording light beam. By contrast, in the state illustrated in FIG. 4C, the imaging distance b" of the focusing light beam is shorter than the imaging distance b of the recording light beam. The relations mentioned above are graphically illustrated in FIG. 5.

Under the circumstances, it is proposed according to the present invention that the driving quantity for the objective lens is detected from the objective-lens control signal 8, the change in the optical path length of the focusing light beam 2 is detected by an auto-focus correcting unit 13 a quantity of influence which the objective-lens control signal 8 undergoes due to the change of the optical path length is arithmetically determined and that a correcting signal 14 is supplied to the control arithmetic unit 7 to thereby compensate for the objective-lens control signal 8 outputted from the control arithmetic unit 7 so that the focused state can be sustained, for thereby enhancing the focusing accuracy.

The objective-lens drive unit 9 is ordinarily implemented in the form of a voice coil. Accordingly, a current flowing through the voice coil may serve as the objective-lens control signal 8. In that case, the relation between the voice coil current and the quantity or magnitude of movement of the voice coil (and hence the objective lens) as driven by the voice coil current can be measured or established in advance. Accordingly, on the basis of the results of the measurement performed in advance, the concerned quantity or magnitude with which the voice coil is driven (i.e., the position of the objective lens) can be determined.

Figure 2:
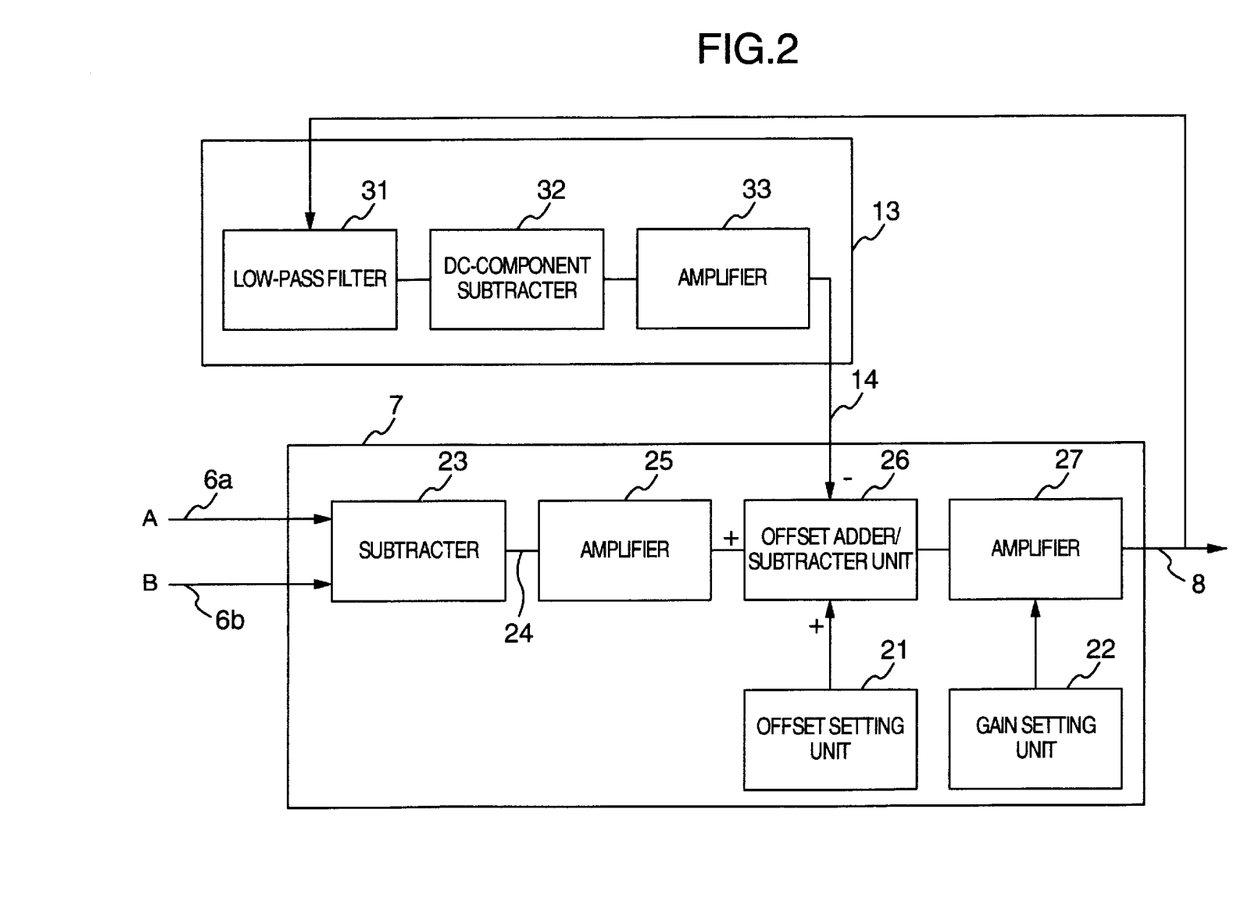
FIG. 2 is a block diagram showing, by way of example, circuit arrangements of a control arithmetic unit and an auto-focus correcting unit, respectively, in the focus control apparatus shown in FIG. 1.

FIG. 2 is a block diagram showing generally and schematically circuit arrangements of the control arithmetic unit 7 and the auto-focus correcting unit 13, respectively. Referring to the figure, the control arithmetic unit 7 includes a subtracter 23 to which the outputs A and B (6a and 6b) of the dual type light receiving element are inputted, whereby a difference signal (A-B) 24 is generated as the output signal of the subtracter 23. After having been amplified by an amplifier 25, the difference signal 24 is inputted to an offset adder/subtracter unit 26 to undergo addition/subtraction processing with the output of an offset setting unit 21 and a correcting signal 14 outputted from the auto-focus correcting unit 13. The output signal of the offset adder/subtracter unit 26 is then amplified by an amplifier 27 whose amplification factor can be set by a gain setting unit 22. The output signal of the amplifier 27 serves as the objective-lens control signal 8. At this juncture, it should be mentioned that a feedback loop including the optical system shown in FIG. 1 is inserted between the output of the amplifier 27 (i.e., the objective-lens control signal 8) and the output A; B (6a; 6b) of the dual type light receiving element 6, wherein the gain setting unit 22 serves to set the loop gain of the feedback loop. Further, the offset setting unit 21 serves to shift the operating point on the difference signal 24 to thereby shift the positions of the focal points of the recording light beam and the focusing light beam 2 relative to each other. By virtue of such offset setting feature, fine adjustment can be realized for the focal points of the recording light beam and the focusing light beam 2. Parenthetically, the output of the offset setting unit 21 is a direct current having a constant level.

The auto-focus correcting unit 13 includes a low-pass filter 31 for eliminating high-frequency components, from the objective-lens control signal, the output signal of which is inputted to a DC-component subtracter 32 for elimination of DC component, whereby low-frequency component (0 to 200 Hz) of the objective-lens control signal 8 is extracted. At this juncture, it is to be noted that the objective-lens control signal 8 bears a proportional relation to the upward/downward movement of the objective lens around the position of the focal point thereof. Since the displacement of the objective lens is equal to the change in the optical path length of the focusing light beam (i.e., distance between the convex lens 12 and the objective lens 3), it is possible to generate the correcting signal 14 by amplifying the low frequency component signal to an appropriate level by means of an amplifier 33. The correcting signal 14 is then inputted to the offset adder/subtracter unit 26 of the control arithmetic unit 7, whereby the feedback loop mentioned previously is implemented. In conjunction with the amplifier 33, it has experimentally been established that the change of the optical path length and the correcting quantity bear a linear relationship to each other. Accordingly, the correcting quantity can be obtained by employing an amplifier having a proper gain as the amplifier 33.

Figure 4A:
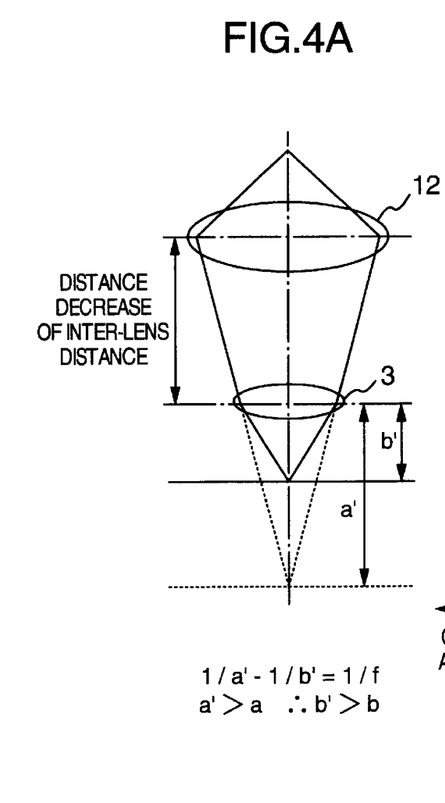
FIGS. 4A, 4B and 4C are views for illustrating change behaviors of a focal length (imaging distance) for a non-parallel focusing light beam in dependence on distance between an objective lens and a convex lens used in the apparatus shown in FIG. 1.
Figure 4B:
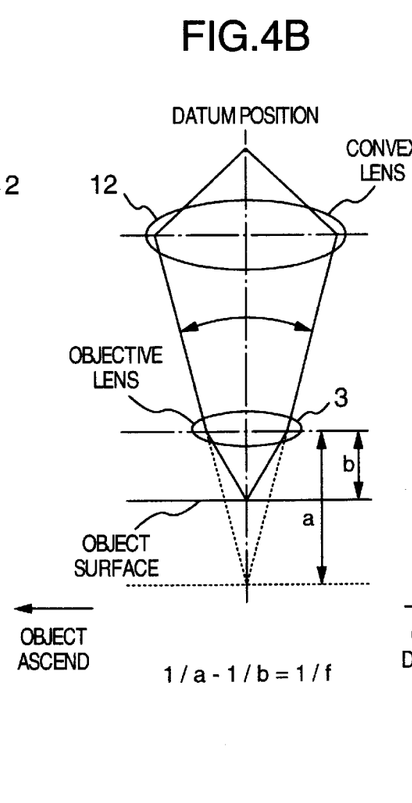
Figure 4C:
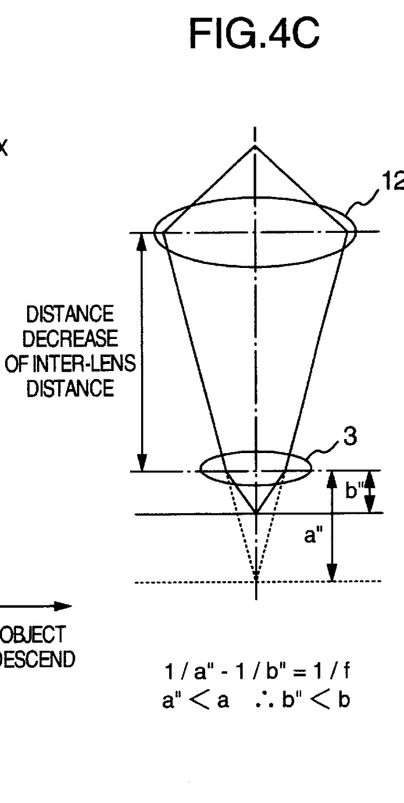
Figure 5:
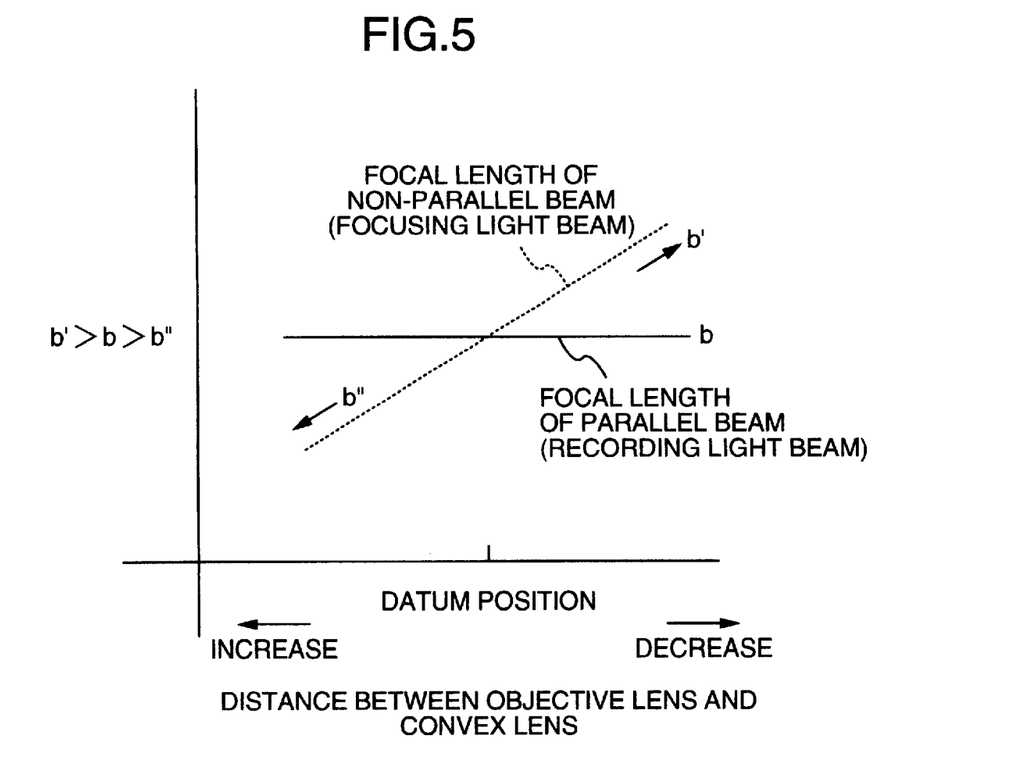
FIG. 5 is a view showing a relation between focal length for a parallel light beam (recording light beam) and that for a non-parallel light beam (focusing light beam) as a function of the distance between the objective lens and the convex lens.

As is apparent from the foregoing, the low frequency component is added, so to say, as disturbance through the feedback loop, whereby the operating point can be sifted to a position deviated from the origin on the S-curve shown in FIG. 3, as a result of which the position of the objective lens 3 is offset such that in the case shown in FIG. 4A, the objective lens 3 is moved downwardly (descended), whereas in the case shown in FIG. 4C, the objective lens 3 is moved upwardly (ascended), whereby the distance between the raw disk or object 4 and the objective lens 3 is maintained at b.

As can now be understood, according to the teachings of the present invention incarnated in the illustrated embodiment thereof, the objective lens is driven by the objective-lens drive unit so as to maintain the focused state while taking into account the change in the optical path length for protecting the focusing accuracy from degradation. To this end, changes in the optical path lengths of the focusing light beam 2 and the reflection light beam 5, respectively, are detected by the auto-focus correcting unit 13, whereon the quantity with which the change of the optical path lengths effects the objective-lens control signal 8 is arithmetically determined to thereby generate the correcting signal 14 which is then inputted to the control arithmetic unit 7. In the control arithmetic unit 7, the quantity mentioned above is subtracted from the objective-lens control signal 8 for thereby generating the proper signal required for maintaining the focused state by driving or displacing the objective lens correspondingly. Thus, the focusing accuracy can be enhanced.

In the foregoing description of the embodiment of the invention, it has been presumed that the amplifier 33 is employed for realizing a linear approximation. However, the present invention is never restricted thereto but any other appropriate means may be employed so far as the change of the optical path length can be transformed into the driving quantity for the objective lens.

Next, referring to FIGS. 6, 7 and 8, description will be made of the focus control apparatus according to another embodiment (second embodiment) of the present invention. In the following description, same or like components or members as those mentioned hereinbefore in conjunction with FIGS. 1 to 5 are denoted by like reference numerals and repeated description thereof will be omitted. In other words, detailed description which follows is directed to components and arrangements which differ from those of the focus control apparatus described previously by reference to FIGS. 1 to 5.

Figure 6:
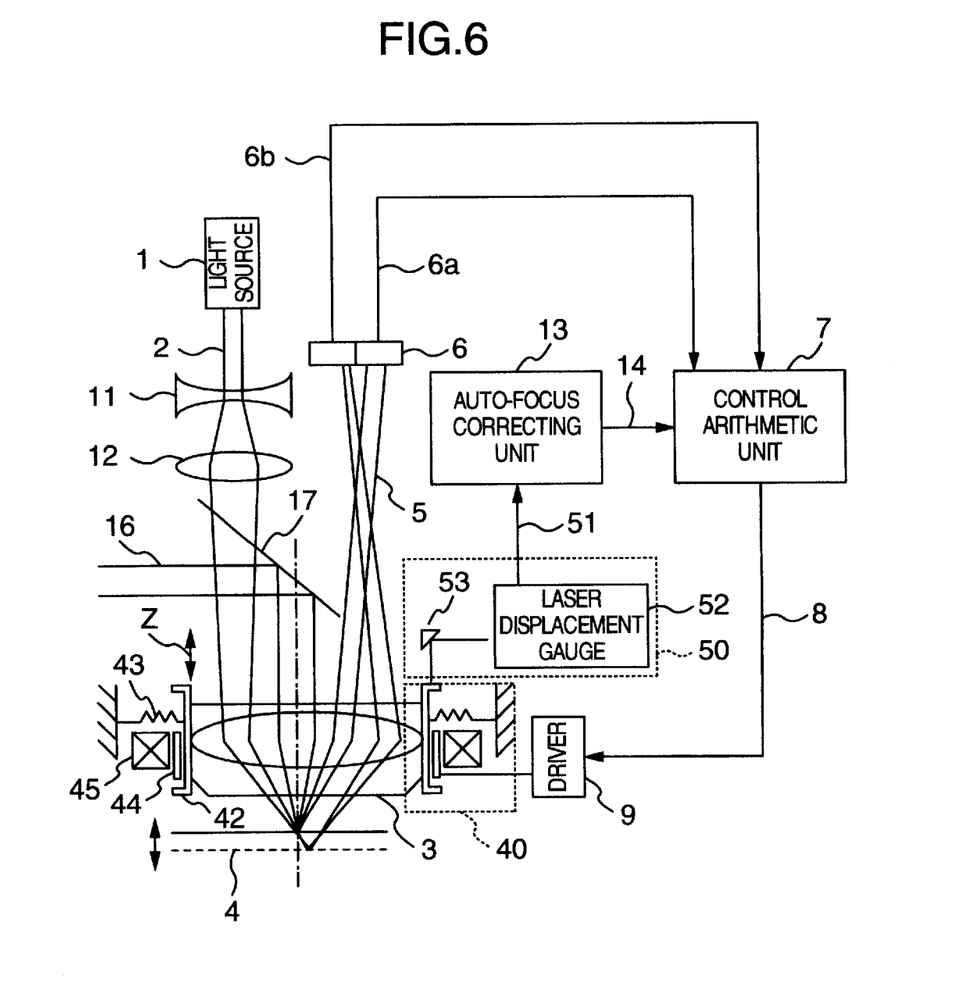
FIG. 6 is a view showing generally and schematically a structure of a focus control apparatus according to another embodiment of the present invention.

Now referring to FIG. 6, in the focus control apparatus shown in this figure, magnitude of displacement of the objective lens 3 is detected by an objective-lens displacement detecting unit 50 while change of the optical path length of the focusing light beam 2 is detected by means of an auto-focus correcting unit 13, wherein a factor or quantity by which the change of the optical path length affects the objective-lens control signal 8 is arithmetically determined to thereby generate an auto-focus correcting signal 14 which in turn is inputted to the control arithmetic unit 7. In response to this auto-focus correcting signal 14, the control arithmetic unit 7 generates an appropriate or proper signal required for maintaining the focused state as the objective-lens control signal 8. In this manner, the focusing precision or accuracy can be enhanced.

The objective-lens displacement detecting unit 50 is comprised of a laser displacement gauge 52 and a mirror 53 for changing the direction of a measuring laser beam outputted from the laser displacement gauge 52. An objective-lens displacement detection signal 51 outputted from the objective-lens displacement detecting unit 50 is obtained in terms of a voltage which represents correspondingly a distance intervening between the objective lens 3 and the laser displacement gauge 52.

Figure 7:
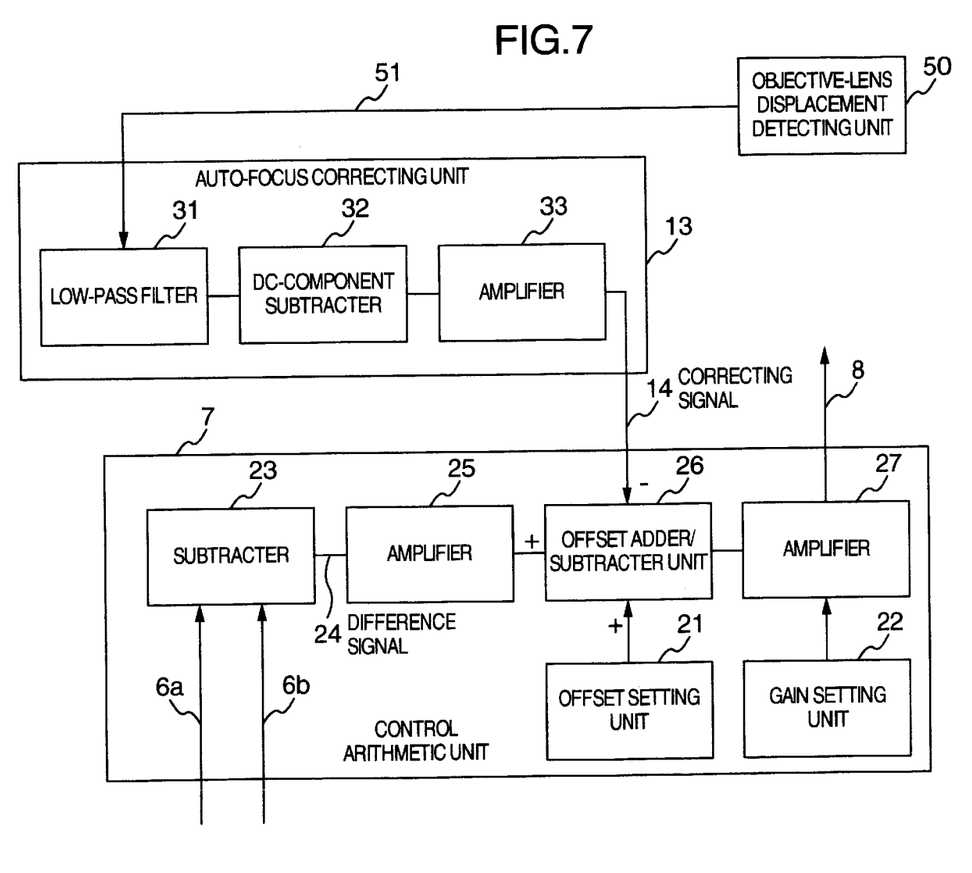
FIG. 7 is a block diagram showing, by way of example, circuit arrangements of a control arithmetic unit and an auto-focus correcting unit, respectively, in the focus control apparatus shown in FIG. 6.

Referring to FIG. 7, high-frequency components contained in the objective-lens displacement detection signal 51 outputted from the objective-lens displacement detecting unit 50 are eliminated by means of a low-pass filter 31 incorporated in the auto-focus correcting unit 13. Subsequently, a DC component of a predetermined constant level is eliminated from the output signal of the low-pass filter 31 by means of a DC component subtractor 32 to thereby extract only a low-frequency signal component (0 to 200 Hz) from the objective-lens displacement detection signal 51.

Since the displacement of the objective lens is effectuated by driving a voice coil, it may be regarded that essentially no high-frequency components are contained in the displacement of the objective lens. In other words, the high-frequency components of the objective-lens displacement detection signal 51 can be considered as noise components. Accordingly, the noise components are eliminated by means of the low-pass filter 31. In this conjunction, it is noted that the signal required for the auto-focus correction depends on the displacement of the objective lens from the state shown in FIG. 4B. Accordingly, with a view to deriving from the objective-lens displacement detection signal 51 the signal in which the DC component corresponding to the state shown in FIG. 4B is subtracted, the DC component is subtracted from the objective-lens displacement detection signal 51 by means of the DC-component subtracter 32, as described above. Incidentally, the value of the DC component in the state shown in FIG. 4B can experimentally be determined or obtained. Through the arithmetic operations described above, magnitude of the displacement of the objective lens in the vicinity of the focal point of the recording light beam, i.e., the change in the optical path length of the focusing light beam, can be obtained.

More specifically, the low-frequency component of the objective-lens displacement detection signal 51 represents magnitude of the displacement in the vertical direction in the vicinity of the focal point of the objective lens. Since the magnitude of displacement of the objective lens is equal to the change of the optical path length of the focusing light beam (i.e., change of the distance between the convex lens 12 and the objective lens 3), it is possible to generate the auto-focus correcting signal 14 by amplifying the low-frequency component by means of an amplifier 33 with appropriate sensitivity.

By inputting the correcting signal 14 to an offset adder/subtracter unit 26 which constitutes a part of the control arithmetic unit 7, a feedback loop is implemented. In conjunction with the amplifier 33, it has experimentally been established that the correcting quantity bears a linear relation to the change of the optical path length. Accordingly, the correcting quantity can be obtained with the amplifier having a proper gain.

Accordingly, it should be appreciated that the present invention is never restricted to the auto-focus of the skew type illustrated in FIGS. 1 and 6 but can find application to the auto-focus of astigmatism type and knife-edge type as well.

Figure 8:
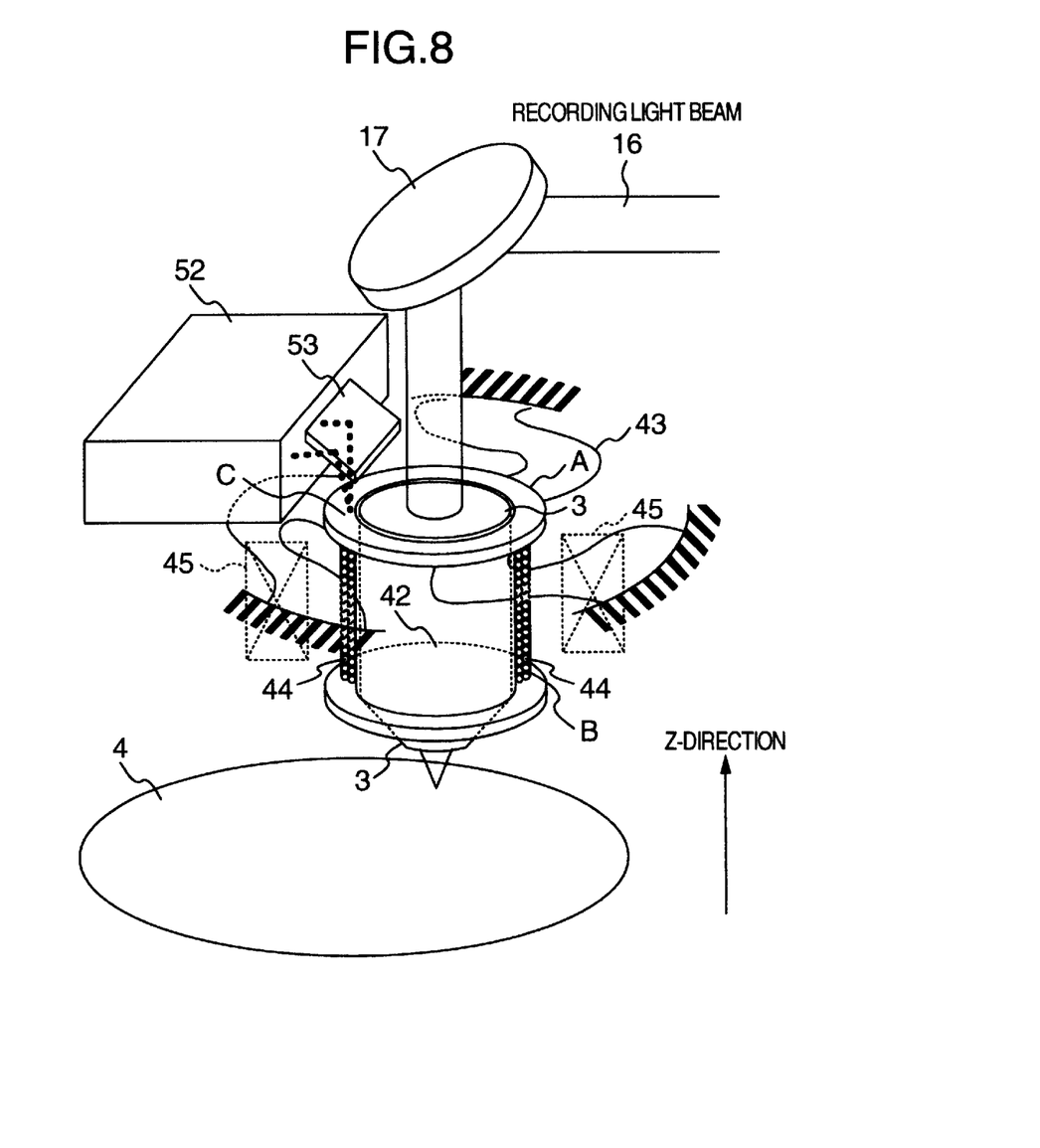
FIG. 8 is a view showing schematically structures of an objective-lens drive unit and an objective-lens displacement detecting unit in the apparatus shown in FIG. 6.

FIG. 8 shows, by way of example, structures of the objective-lens actuator 40 and the objective-lens displacement detecting unit 50 shown in FIG. 6.

Referring to FIG. 8, the objective-lens actuator 40 is comprised of a lens holder 42, a leaf spring 43, a coil 44 and a magnet 45. The lens holder 42 to which the objective lens 3 is bonded is held by three leaf springs 43 at each of two locations in the Z-direction (i.e., at planes A and B, respectively, although leaf springs disposed at the plane B are omitted from illustration) so that the lens holder 42 can move in a Z-direction orthogonal to the raw disk 4. Thus, the objective lens 3 and the lens holder 42 can be driven in the Z-direction in dependence on the current flowing through the coil 44.

In FIG. 8, at tow portions of surface A (upper surface of the lens holder) and surface B (lower surface of the lens holder), blade springs are disposed and blade spring at surface B is abbreviated. In this figure, three-set of blade springs are disposed.

The lens holder 42 is driven in the Z-direction orthogonal to the raw disk 4 by means of the voice coil 44. As the laser displacement gauge 52, the gauge having a resolution of 0.1 μm and an operating distance on the order of 10 mm is commercially available. The recording light beam 16 and the focusing light beam 2 impinge onto the objective lens 3 from the above. Accordingly, in many practical applications, optical parts are disposed above the objective lens 3. In this conjunction, it should be mentioned that in the focus control apparatus according to the instant embodiment of the invention, the laser displacement gauge 52 is so disposed that the emitting direction of the laser beam extends laterally or horizontally as viewed in the figure with a view to implementing in a compact structure the optical system disposed above the objective lens 3. In this arrangement, the lens holder end face C of the detector unit is illuminated with the measuring laser beam emitted from the laser displacement gauge 52 by way of a mirror 53, as is indicated by a broken line. The laser displacement gauge 52 includes light emitting portion generating the laser beam impinging onto the top end of the lens holder 42 via the mirror 53 and a photoelectric conversion element which receives reflection laser beam reflected at the top end of the lens holder 42. Since the traveling path of this laser beam is so set that the laser beam impinges in a direction inclined relative to the moving direction of the lens holder 42 and then undergoes reflection on the top end of the lens holder 42 with inclination, the quantity of light received by the photoelectric conversion element becomes different in dependence on the vertical positions of the lens holder 42. As a consequence, the electric signal generated by the photoelectric conversion element varies in dependence on the vertical position of the lens holder 42. As the laser displacement gauge 52 of the type described above, there may be mentioned, for example, "CCD laser Displacement Sensor LK-3100" manufactured by KEYENCE CORPORATION.

According to the teachings of the present invention incarnated in the embodiment described above, the focus control for the exposure system can be realized without need for using the achromatic lens as the objective lens.

Many modifications and variations of the present invention are possible in the light of the above techniques. It is therefore to be understood that within the scope of the appended claims, the invention may be practiced otherwise than as specifically described.

What is claimed is:

1. A focus control apparatus, comprising:

an objective lens movable in an optical axis direction;

parallel light beam generating means disposed in opposition to a target with the objective lens being interposed between the parallel light beam generating means and the target, for generating a parallel light beam which forms an image at a predetermined position after passing through the objective lens;

focusing light beam generating means disposed in opposition to the target with the objective lens being interposed between the focusing light beam generating means and the target, for generating a non-parallel focusing light beam which forms an image at a predetermined position after passing through the objective lens;

focus detecting means for detecting an imaging state of the focusing light beam on the target;

auto-focus control means for controlling position of the objective lens in accordance with result of detection derived from output of the focus detecting means;

position detecting means for detecting position in the optical axis direction of the objective lens; and position correcting means for correcting the auto-focus control means for controlling position of the objective lens in response to a detection signal outputted from the position detecting means.

2. A focus control apparatus according to claim 1, wherein the detection signal outputted from the position detecting means is supplied to the auto-focus control means.

3. A focus control apparatus, comprising:

an objective lens moveable in an optical axis direction;

a parallel light beam generating unit disposed in opposition to a target with the objective lens being interposed between the parallel light beam generating unit and the target, for generating a parallel light beam which forms an image at a predetermined position after passing through the objective lens;

a focusing light beam generating unit disposed in opposition to the target with the objective lens being interposed between the focusing light beam generating unit and the target, for generating a non-parallel focusing light beam which forms an image at a predetermined position after passing through the objective lens;

a focus detecting unit for detecting an imaging state of the focusing light beam on the target;

a drive unit for controlling position of the objective lens in accordance with a detection signal derived from output of the focus detecting unit;

a position detecting unit for detecting position in the optical axis direction of the objective lens; and a path for supplying to the drive unit a detection signal outputted from the position detecting unit.

4. A focus control apparatus according to claim 3,
wherein the drive unit includes a supporting member which supports the objective lens and which can move together with the objective lens, the position detecting means being comprised of a laser light source for emitting a laser beam toward the supporting member, a photoelectric conversion unit for receiving reflected light of the laser beam reflected at the supporting member to thereby generating an electric signal corresponding to a quantity of light received, and a filter for eliminating a DC component and high-frequency components from the electric signal.

5. A focus control apparatus according to claim 1, wherein the objective lens is a non-achromatic lens.

6. A focus control apparatus according to claim 3, wherein the objective lens is a non-achromatic lens.

7. A focus control apparatus according to claim 3, wherein the drive unit for further controlling position of the objective lens in accordance with the detection signal outputted from the position detecting unit.

8. A focus control apparatus according to claim 1, wherein the position correcting means for controlling position of the objective lens for compensation correction of an optical path length of the focusing light beam.

9. A focus control apparatus according to claim 3, wherein the position correcting means for controlling position of the objective lens for compensation correction of an optical path length of the focusing light beam.

10. A focus control apparatus, comprising:
an objective lens movable in an optical axis direction;
a parallel light beam source to output a parallel light beam which forms an image at a predetermined position with respect to a target after passing through the objective lens;
a focusing light beam source to output a non-parallel focusing light beam which forms an image at a predetermined position with respect to the target after passing through the objective lens;
a focus detector unit to detect an imaging state of the focusing light beam on the target;
an auto-focus circuit to control a position of the objective lens in accordance with a result of detection derived from an output of the focus detector unit;
a position detector unit to detect a real-time position of the objective lens in the optical axis direction of the objective lens; and
a position correcting circuit to correct the auto-focus circuit responsive to a detection signal outputted from the position detector unit.

11. A focus control apparatus according to claim 10,
wherein a processed version of the detection signal outputted from the position detector unit is supplied by the position correcting circuit to the auto-focus circuit as a correction signal.

12. A focus control apparatus according to claim 10, wherein the position detector unit to detect a real-time position of the objective lens in the optical axis direction of the objective lens, by at least one of:
using an auto-focus signal outputted from the auto-focus circuit to detect the position in the optical axis direction of the objective lens; and using a light reflector/detector to impinge a light onto a reference structure moveable with the objective lens, and to use the light reflected therefrom to detect the position in the optical axis direction of the objective lens.

13. A focus control apparatus according to claim 10, wherein the objective lens is a non-achromatic lens.

14. A focus control apparatus according to claim 10, wherein the position correcting circuit to effect controlling of position of the objective lens for compensation correction of an optical path length of the focusing light beam.

15. A recording system comprising:
a memory to store/supply information to be recorded; and
a focus control apparatus, including:
an objective lens movable in an optical axis direction;
a parallel light beam source to output a parallel light beam which forms an image at a predetermined position with respect to a target after passing through the objective lens;
a focusing light beam source to output a non-parallel focusing light beam which forms an image at a predetermined position with respect to the target after passing through the objective lens;
a focus detector unit to detect an imaging state of the focusing light beam on the target;
an auto-focus circuit to control a position of the objective lens in accordance with a result of detection derived from an output of the focus detector unit;
a position detector unit to detect a real-time position of the objective lens in the optical axis direction of the objective lens; and
a position correcting circuit to correct the auto-focus circuit responsive to a detection signal outputted from the position detector unit.

16. A focus control apparatus according to claim 15,
wherein a processed version of the detection signal outputted from the position detector unit is supplied by the position correcting circuit to the auto-focus circuit as a correction signal.

17. A focus control apparatus according to claim 15, wherein the position detector unit to detect a real-time position of the objective lens in the optical axis direction of the objective lens, by at least one of:
using an auto-focus signal outputted from the auto-focus circuit to detect the position in the optical axis direction of the objective lens; and
using a light reflector/detector to impinge a light onto a reference structure moveable with the objective lens, and to use the light reflected therefrom to detect the position in the optical axis direction of the objective lens.

18. A focus control apparatus according to claim 15, wherein the objective lens is a non-achromatic lens.

19. A focus control apparatus according to claim 15, wherein the position correcting circuit to effect controlling of position of the objective lens for compensation correction of an optical path length of the focusing light beam.

* * * * *